United States Patent
Mane et al.

(10) Patent No.: US 12,093,559 B2
(45) Date of Patent: Sep. 17, 2024

(54) DISTRIBUTED DATA STORAGE SYSTEM WITH DEDICATED PROCESSING LANE

(71) Applicant: Seagate Technology LLC, Fremont, CA (US)

(72) Inventors: Hemant Vitthalrao Mane, Niwot, CO (US); Jason Matthew Feist, Minneapolis, MN (US); Praveen Viraraghavan, Chicago, IL (US); Robert W. Dixon, Longmont, CO (US); Marc Timothy Jones, Longmont, CO (US); Steven Williams, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 148 days.

(21) Appl. No.: 17/847,704

(22) Filed: Jun. 23, 2022

(65) Prior Publication Data

US 2023/0418507 A1 Dec. 28, 2023

(51) Int. Cl.
*G06F 3/06* (2006.01)
(52) U.S. Cl.
CPC .......... *G06F 3/0655* (2013.01); *G06F 3/0604* (2013.01); *G06F 3/067* (2013.01)
(58) Field of Classification Search
CPC .......... G06F 3/0611; H04N 1/00901
See application file for complete search history.

(56) References Cited

U.S. PATENT DOCUMENTS

| | | | |
|---|---|---|---|
| 8,539,124 B1 * | 9/2013 | Burke | G06F 3/0644 710/65 |
| 10,146,566 B2 * | 12/2018 | Malakapalli | G06F 9/45533 |
| 10,248,791 B2 | 4/2019 | Pappachan et al. | |
| 10,601,593 B2 | 3/2020 | Antonopoulos et al. | |
| 10,673,638 B2 | 6/2020 | Gulati et al. | |
| 2016/0005488 A1 * | 1/2016 | Han | G11C 16/20 365/185.18 |
| 2016/0132040 A1 * | 5/2016 | Noguchi | G05B 19/41805 700/118 |
| 2017/0150032 A1 * | 5/2017 | Chenn | H04N 23/66 |
| 2017/0344498 A1 * | 11/2017 | Voor | G06F 3/065 |
| 2018/0139570 A1 * | 5/2018 | Calvarese | H04W 4/021 |
| 2020/0213465 A1 * | 7/2020 | Shimamura | H04N 1/00901 |
| 2020/0272744 A1 | 8/2020 | Kaushik et al. | |
| 2021/0026559 A1 * | 1/2021 | Richter | G06F 3/0611 |

* cited by examiner

*Primary Examiner* — Getente A Yimer
(74) *Attorney, Agent, or Firm* — Hall Estill Law Firm (57) ABSTRACT

A distributed data storage system may connect a host to a device and a dedication module. The dedication module can identify a manufacturing origin of the device before dedicating a type of host-generated data access request to the device. The type of host-generated data access request is chosen by the dedication module in response to an operating capability correlated to the device by the dedication module based on the identified manufacturing origin. At least one host-generated request of the dedicated type is then completed with the device.

20 Claims, 4 Drawing Sheets

DISTRIBUTED DATA STORAGE SYSTEM WITH DEDICATED PROCESSING LANE

SUMMARY

Embodiments of the present disclosure are generally directed to optimization of system performance in response to a detected identification of the manufacturing origin of system hardware.

A distributed data storage system, in some embodiments, connects a host to a device and a dedication module. The dedication module identifies a manufacturing origin of the device before dedicating a type of host-generated data access request to the device. The type of host-generated data access request is chosen by the dedication module in response to an operating capability correlated to the device by the dedication module based on the identified manufacturing origin. At least one host-generated request of the dedicated type is then completed with the device.

In other embodiments, a distributed data storage system connects a host to a device and a dedication module that identifies a manufacturing origin of the device before dedicating a system operation to be completed solely by the device. The system operation is chosen by the dedication module in response to an operating capability correlated to the device by the dedication module based on the identified manufacturing origin.

Assorted embodiments of a distributed data storage system connect a host to a plurality of devices and a dedication module that identifies a manufacturing origin of a first device before dedicating a type of host-generated data access request to the first device. The type of host-generated data access request is chosen by the dedication module in response to an operating capability correlated to the first device by the dedication module based on the identified manufacturing origin. The dedication module predicts an operational trigger being met by at least one of the plurality devices and proceeds to complete at least one host-generated request of the dedicated type with the first device.

These and other features which may characterize various embodiments can be understood in view of the following detailed discussion and the accompanying drawings.

DETAILED DESCRIPTION

Generally, embodiments of a data storage system are directed to detecting an origin of system hardware and intelligently employing hardware dedication to optimize the performance and efficiency of satisfying system operations as well as requests for data access (sometimes collectively referred to as "system activity").

Over time, greater volumes of data are generated, transferred, and accessed by a growing number of users. Data storage systems have evolved to accommodate higher volumes of data by providing relatively large data repositories that can be accessed by multiple different hosts. The use of numerous separate data storage devices, instead of a single device, allows modularity and dynamic adaptability to changing host demands and system performance to provide consistent operation for a range of activity, such as data encryption, error recovery, memory maintenance, and new device initialization. However, the modularity of a data storage system can result in differently configured devices operating in conjunction, which can jeopardize the efficiency and/or capabilities of some devices.

Accordingly, many data storage systems operate at less than maximum performance, either voluntarily or non-voluntarily, to accommodate the use of devices with different operating capabilities, protocol, and/or hardware. While a data storage system may perform with consistent performance reduced from maximum potential, various embodiments configure a data storage system to passively or actively detect the manufacturing origin of a device and alter operating parameters to take advantage of operating capabilities and/or protocol of the known device origins to provide increased system performance, efficiency, security, and/or availability. The ability to dedicate portions of a device of known, trusted device manufacturing origin to particular operations allows for selectable performance and distribution of system processing that optimizes current and/or future system operation.

Figure 1:
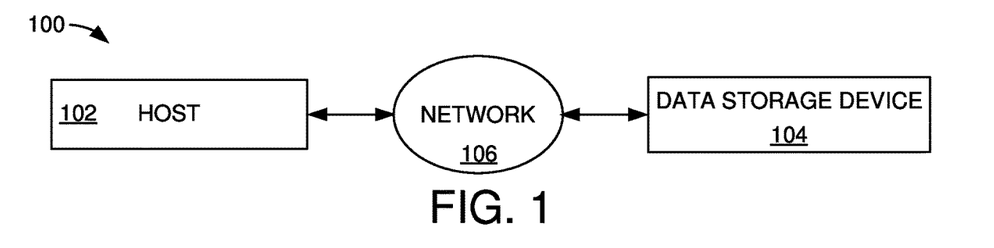
FIG. 1 depicts a block representation of an example data storage system in which various embodiments can be practiced.

A block representation of an example distributed data storage system 100 is illustrated in FIG. 1. While not limiting, the data storage system 100 connects a host 102 to a data storage device 104 via a network 106. A host 102 can be any intelligent node that can generate data access requests that are satisfied by the intelligence of the data storage device 104. It is noted that the network 106 can be any individual, or combination, of wired and/or wireless signal pathways that allow the data storage device 104 to in nearly any physical location on the planet to store data generated by the host 102.

Figure 2:
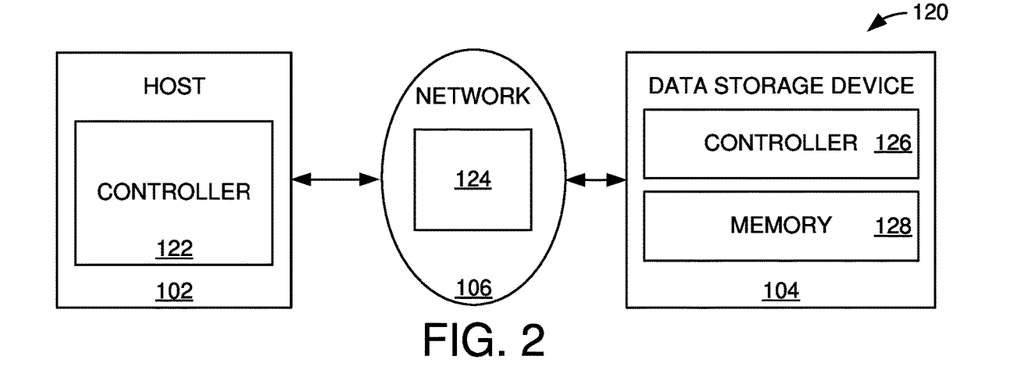
FIG. 2 depicts a block representation of portions of an example data storage system arranged in accordance with some embodiments.

FIG. 2 depicts a block representation of portions of an example distributed data storage system 120 arranged in accordance with various embodiments. Any number of hosts 102 may be connected to one or more data storage devices 104 via a network 106 that consists of at least one centralized intelligence that schedules and distributes various data and system activities to selected data storage devices 104 for execution.

Although not required or limiting, the respective hosts 102 can have a controller 122 that generates data and data access requests that are distributed to selected data storage devices 104 by a network controller 124 and subsequently satisfied by a local device controller 126. The ability to interconnect and utilize numerous different data storage devices 104 allows increasing numbers of hosts 102 to be serviced concurrently. The use of sophisticated data management protocol, such as NVMe, can further take advantage of the concurrent utilization of assorted data storage devices 104 to provide relatively high data access performance.

However, the flow of data, data access requests, and system tasks through the upstream network components, such as servers, switches, and nodes employing the network controller 124, can experience performance bottlenecks over time. Particularly in high data access request volume conditions employing NVMe protocol, the network components can be overwhelmed and consequently provide reduced data access performance to one or more hosts 102. The addition of assorted memory and data tasks that are necessary to maintain data and memory reliability further exacerbates the performance degradation associated with high volume conditions.

Figure 3:
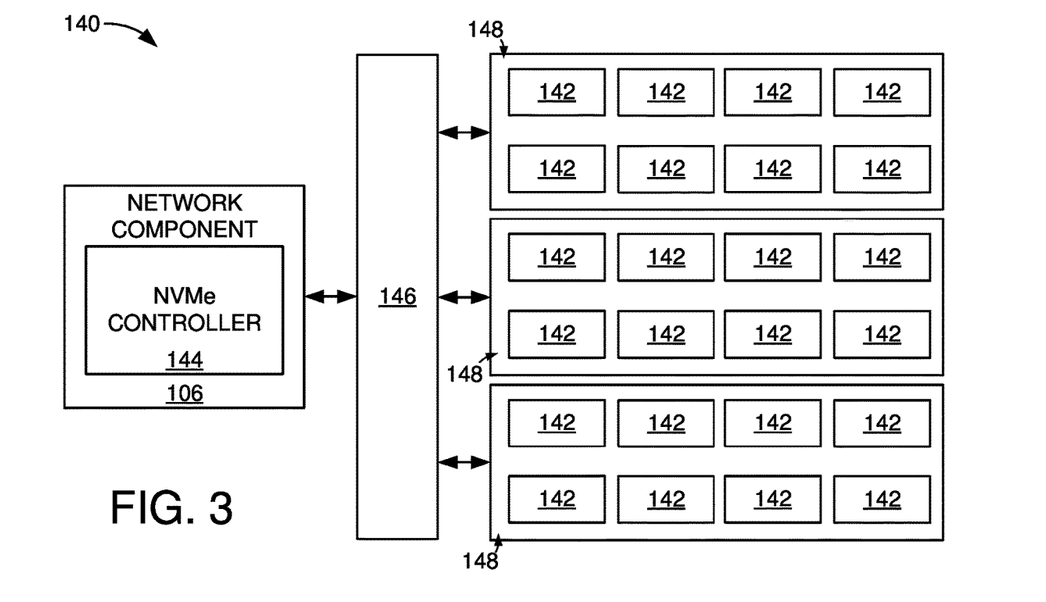
FIG. 3 depicts a block representation of portions of an example data storage system configured and operated in accordance with assorted embodiments.

FIG. 3 depicts a block representation of portions of another example distributed data storage system 140 configured in accordance with some embodiments to employ an NVMe protocol to satisfy host-generated data access requests to, and from, various solid-state memories 142 resident in one or more data storage devices 104. The system 140 has an NVMe controller 144 that arranges a number of data queues 146 and namespaces 148 to accommodate the data handling capabilities of the NVMe protocol.

Generally, NVMe is a communications interface and driver that defines a command set and feature set for PCIe-based solid-state drives (SSDs) with the goals of increased and efficient performance and interoperability on a broad range of enterprise and client systems. NVMe was designed for SSD as a layer between the device driver and the PCIe device, standardizing the rules with emphasis on scalability, low latency, and security. NVMe communicates between the storage interface and the System CPU using high-speed PCIe sockets, independent of storage form factor. Input/Output tasks performed using NVMe drivers begin faster, transfer more data, and finish faster than older storage models using older drivers, such as serial ATA (SATA) SSDs. Because it was designed specifically for SSDs, NVMe is becoming the new industry standard for both servers in the data centers and in client devices like laptop, desktop PCs and even next gen gaming consoles.

The standard developed to allow modern SSDs to operate at speeds flash memory is capable of, a sharp advantage with faster read-write. The NVMe SSD enables the flash memory to run directly through the PCI Express (PCIe) serial bus interface as it offers high bandwidth due to being directly attached to the CPU rather than function through the limiting SATA speeds. As SSDs superseded the slower HDDs as primary storage, a fast interface was required to achieve optimal use of the quicker speed capabilities.

That is, NVMe is a technological depiction of the bus, the memory component (SSD) uses to communicate with the computer, and not exactly a new type of memory. A communications interface and driver can outline a command set and feature set of PCIe based SSD. NVMe technology is available in a number of form factors such as the PCIe card slot, M.2, and U.2, but with all form factors, it directly connects electrically to the motherboard via the PCIe rather than SATA connection.

NVMe, in some configurations, can support multiple I/O queues, up to 64K with each queue having 64K entries. Legacy SAS and SATA can only support single queues and each can have 254 & 32 entries respectively. The NVMe host software can create queues, up to the maximum allowed by the NVMe controller, as per system configuration and expected workload. NVMe supports scatter/gather IOs, minimizing CPU overhead on data transfers, and even provides the capability of changing their priority based on workload requirements. The interface is designed for high scalability and NVM independence to enable next-generation technologies to deliver sustained 4 KB of random accesses over 1 million I/Os per second, which translates to 1 µs or less per command.

NVMe doesn't need the intervening host bus adapter (HBA) and can connect to a higher number of PCIe lanes. A SAS lane runs at 12 Gb per second, which contracts to just about 1 GB per second after overheads. As well, a SATA lane may drop performance to half of that, while a Gen5 PCIe lane runs at 32 Gb per second, or approximately 15.75 GB/s, for four lanes with overhead. Since a SATA SSD runs at 0.5 GB/s, and a typical NVMe PCIe Gen5 SSD is configured to use 4 lanes, an NVMe SSD can achieve nearly 32 times higher throughput than the SATA SSD.

It is noted that NVMe is not affected by the ATA interface constrictions as it sits right on the top of the PCI Express directly connected to the CPU. That results in four times faster Input/Output Operations Per Second (IOPs) rivaling the fastest SAS option available. NVMe can deliver sustained read-write speed of 2000 MB per second. NVMe enables drives to benefit from the same "pool" of lanes that directly connect to the CPU, which offers scalable performance by going beyond the conventional four lanes found in most PCIe SSDs and utilize them for added performance. PCIe sockets transfer more than 25 times more data than their SATA equivalent.

However, NVMe storage can have performance issues that result in added cost and inconvenience. For instance, traditional storage controllers, such as flash or HDD controllers, can only handle low levels of I/O processing and create latency and cap performance of NVMe systems. Additionally, the shear number of possible concurrent commands being processed simultaneously risks inefficiency, complexity, excess power consumption, and unwanted processing. Hence, simplification and system optimization that allows for efficient and adaptable NVMe operation can enhance the capabilities and performance of SSDs both alone and in pooled data center environments.

With the capabilities of NVMe, it can be appreciated that the concurrent use of multiple lanes can provide increased performance while suffering from added complexity that jeopardizes the security and reliability of data, at times. As an example, intelligent operation of queues 146 that temporarily hold data before storage into selected logical namespaces 148 can provide maximum operational performance, during some volumes of host-generated data access requests, but have operational bottlenecks that slow data access, delay data rebuilding, and/or delay security operations on data and/or memory during heightened volumes of requests.

Such request dependent performance can be exacerbated by system tasks that function to maintain the reliability of memory and data stored in the memory. That is, the generation, scheduling, distribution, and satisfaction of system tasks, such as security, RAID, error correction code, firmware, device initialization, data mapping, and metadata operations, can complicate upstream network and/or NVMe controllers 144 to produce one or more performance bottlenecks that slow, delay, and/or cancel completion of system tasks and/or host-generated data access requests.

While the identification of performance bottlenecks can allow for intelligent diversion of system tasks downstream to selected data storage devices for execution, the processing of system tasks downstream can fail to mitigate a bottleneck, particularly during high data access request volume conditions. Hence, assorted embodiments are directed to taking advantage of the configuration of various system 140 components to optimize operational efficiency and mitigate the impact of performance bottlenecks over time.

Accordingly, embodiments are directed to identifying the manufacturing origin of system components and altering operational parameters to components with known, trusted origins to maintain at least system performance, such as latency, error rate, and overall time to completion, for host-generated data access requests over time, which provides seamless system operation despite dynamic volumes of activity involving data and/or system memory 142. In other words, the assorted issues associated with NVMe network traffic complexity and inefficiency has prompted the reconfiguration of hardware that has a known, trusted origin to prevent performance bottlenecks and maintain system performance despite relatively high volumes of system activity.

Figure 4:
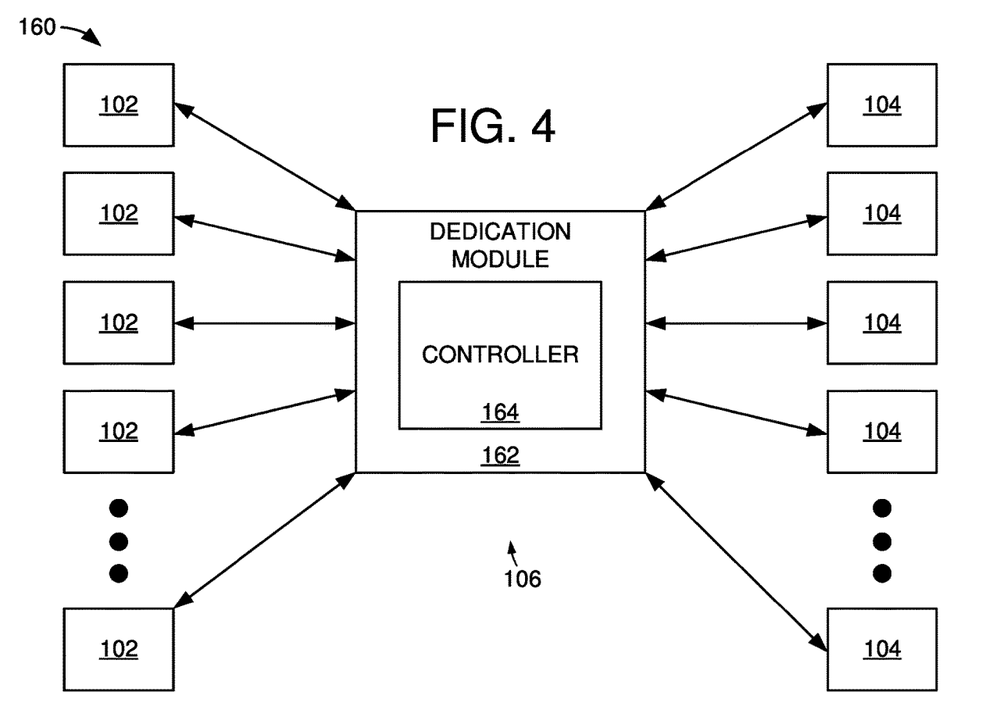
FIG. 4 depicts a block representation of portions of an example data storage system utilized in accordance with various embodiments.

FIG. 4 depicts a block representation of portions of an example distributed data storage system 160 utilized in accordance with various embodiments. Connection of a dedication module 162 to at least one host 102 and at least one data storage device 104 allows for recognition of the manufacturing origin of the data storage device 104. That is, a controller 164 of the dedication module 162 can passively and/or actively identify an origin of a connected device, such as a manufacturer of the device prior to release to an end-user or an original version of firmware operating on the device prior to connection to the network 106. It is contemplated that a device's origin corresponds to the manufacturer of some device hardware, such as the controller, memory, bus, port, lane, channel, motherboard, or system-on-chip (SoC).

The connection of familiar data storage components, such as data storage devices, network controllers, and network nodes allows for the use of trusted data and/or processing channels/lanes. Such dedicated aspects can be employed, in some embodiments, for selected system tasks, such as cryptographic operations, error correction code assignment, error correction code utilization for data rebuilding, RAID operations, firmware upgrades, security operations, and device initializations. The dedication of a channel/lane for a selected tasks and operations can enhance security as well as increase operational efficiency as complex operations can be conducted exclusively. The ability to dedicate a channel/lane for selected tasks further allows NVMe protocol to be employed without jeopardizing data or memory security or process flow.

Recognition of a device's manufacturing origin, in other embodiments, allows hardware to be utilized for a variety of purposes that are unavailable, or ill-advised, when the hardware has an unknown, untrusted origin. For instance, supplemental controllers, cache, switches, and/or connections can be activated and utilized without concern for incompatibility, firmware alterations, or security mismatches. It is contemplated that hardware from known origins can be dynamically assigned functions and tasks by the dedication module 162 in response to changing operational conditions. The use of NVMe protocol for known origin components, such as an NVMe switch, can provide enhanced capabilities and/or performance that would otherwise not be capable with non-trusted components with unknown origins and/or operational configurations.

Through the passive recognition of hardware origin, component initializations and security protocol can be streamlined. That is, a trusted, known origin component allows some, or all, of a component's initialization to be skipped, ignored, or abbreviated. Knowing that a component is trusted and/or has a common operating/security/communication protocol allows the component to be utilized more efficiently than if normal component initializations were conducted. The initialization-less component connection can be employed for dedicated NVMe operation that is unimpeded by initializing the component into the system, building a security profile, and loading firmware.

Other embodiments enabled by the recognition of trusted component with a known origin involve sharing data storage functionality that would, otherwise, require re-initializing a non-trusted component to have matching operational and security protocol. Particular embodiments can be directed to shared RAID configurations/functions, error correction, security authentication, drivers, processing, or caching. Sharing functionality among components with known origins can be specifically optimal in distributed systems that employ data storage devices from different brands. For example, known origin components can identify one another and establish optimized functionality independent, and potentially autonomously, of unknown component origins, such as NVMe data access request execution, queue management, garbage collection, or metadata protocol.

The intelligence and efficiency provided by the circuitry of the dedication module 162 allows for both passive and active evaluation of a system component 104 to identify and/or predict the component's origin. For instance, the dedication module 162 can passively monitor activity of a component 104 to predict and/or detect what manufacturer released the component 104, what firmware was initially installed on the component 104, and what hardware is present in the component 104, which can be generally characterized as the "origin" of the component 104. It is noted that "passive" evaluation of a component 104 is not limited to a particular procedure or timing, but can consist of evaluating operational parameters while the component 104 operates to complete other system tasks and/or host-generated data access requests. Conversely, "active" evaluation of a component 104 can consist of testing of the component 104 with test patterns of data and/or signals generated by the dedication module 162 to identify operational parameters and configurations that indicate the origin of the component 104.

Figure 5:
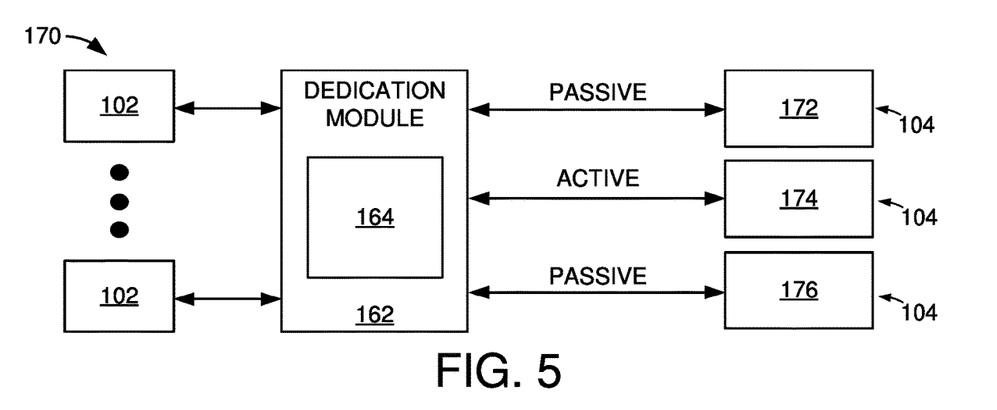
FIG. 5 depicts a block representation of an example hardware module capable of being employed in the data storage system of FIGS. 1-4.

FIG. 5 depicts a block representation of portions of an example distributed data storage system 170 that utilizes a dedication module 162 to evaluate and identify the manufacturing origin of connected hardware. The system 170 can have any number of hosts 102 connected to any number of data storage devices 104 through one or more network components as well as circuitry of the dedication module 162. The devices 104 can have similar, or dissimilar, configurations, such as memory type, capacity, speed, reliability, and origin.

In the non-limiting example of FIG. 5, a first data storage device 172 has previously been connected and utilized by the system 170 without having an origin evaluation. Meanwhile, a new data storage device 174 is connected to the system and a third data storage device 176 has had less than all of its hardware identified by manufacturing origin. The dedication module 162 can intelligently determine how and when the various unidentified hardware of the system 170 are identified. It is noted that the data storage system 170 can operate for any amount of time with unidentified constituent hardware.

In accordance with various embodiments, the dedication module 162 can decide if hardware origin evaluation is to be conducted and, if so, will such evaluation be passive or active. A passive origin identification involves monitoring hardware activity over time during the execution of commands, requests, and tasks not specifically directed to origin identification. That is, passive origin evaluation does not generate any specific commands or requests to determine hardware origin and, instead, monitors satisfaction of general device 104 activity for operational parameters that indicate hardware origin. For instance, passive identification can monitor one or more operational metrics, such as power consumption, latency, overall time to completion, and maximum speed, along with operational configurations, such as generated error correction code, parity, metadata, and encryption, to determine what manufacturer created the hardware.

The correlation of passively attained operational activity of hardware can accurately identify what manufacturer created the hardware due to understood manufacturer behavior and/or performance that is unique. For example, evaluation of the latency of assorted data access requests to a memory can indicate the manufacturer (origin) of the memory, a device bus, or signal channel. It is contemplated that multiple different aspects of hardware operation can be utilized to identify the origin of hardware. Some embodiments initially predict the origin of hardware and subsequently discover operational activity that confirms, or negates, the predicted origin.

The passive identification of the manufacturing origin of hardware can be less processing intensive than active origin testing, but can take greater time as the dedication module 162 may wait for commands and/or requests to provide information that can be used to identify hardware origin. In contrast, active origin identification can be faster, and potentially more accurate than passive identification, but at the cost of greater processing burden on the system 170. That is, active hardware origin identification involves a unique testing procedure where operational aspects of hardware are evaluated independently from commands, requests, and tasks generated by other aspects of the system 170. Active origin identification can generate data, commands, and signals to sequentially, or redundantly, poll the operational performance and/or capabilities of hardware, which indicates which manufacturer released the hardware for end-user use.

The non-limiting example of FIG. 5 illustrates how the dedication module 162 can conduct different origin identification protocol for different aspects of a data storage system 170. The intelligent evaluation of available system 170 capabilities with respect to pending data access requests, system tasks, and logged device 104 behaviors allows the dedication module 162 to select an origin identification protocol that operates without degrading average data access performance over time, which provides a seamless origin identification to a connected host 102. In other words, the dedication module 162 can choose and adapt how hardware origin is identified to ensure average data access performance, such as latency and time to completion, does not decrease while hardware is evaluated. The ability to adapt to different protocol in response to changing conditions further enables the dedication module 162 to intelligently recognize the origin of hardware and optimize the connection of known, trusted devices.

Through the recognition of hardware manufacturing origin, the dedication module 162 can identify opportunities for operational optimizations that take advantage of known aspects of hardware from trusted manufacturers. The intelligent use of active or passive hardware origin identification without degrading system performance begins system optimization that leverages known aspects of hardware origin to increase capabilities and performance over time. One such optimization can be the diversion of system tasks to hardware with known origins that can satisfy both assigned tasks and host-generated data access requests without degrading average system performance.

Figure 6:
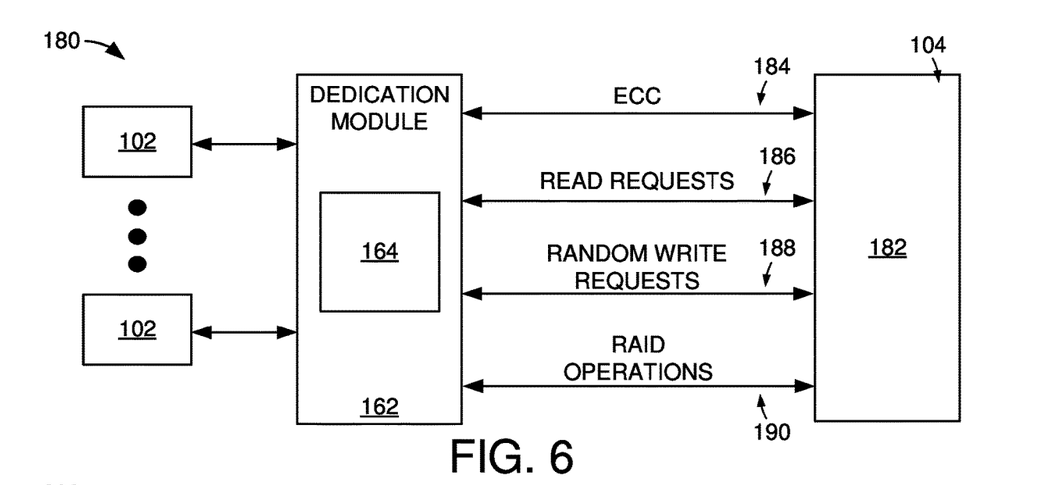
FIG. 6 depicts a block representation of portions of an example data storage system utilized in accordance with various embodiments.

An example distributed data storage system 180 shown in FIG. 6 illustrates how a single data storage device 182 can be utilized by a dedication module 162 in accordance with various embodiments to provide optimized reactions to the discovery, or prediction, of the manufacturing origin of hardware. Whether determined via active or passive hardware evaluation, as discussed in system 170, the identification of what manufacturer initially created and released the hardware to a customer allows the dedication module 162 to execute portions of a dedication strategy that prescribe particular aspects of hardware for system operations selected to take advantage of the operational capabilities and/or configuration to increase system 180 performance over time.

It is contemplated, but not required, that the identified hardware is a bus, channel, lane, or port that can be manipulated by the dedication module 162 to conduct a single type of operation. The non-limiting example of FIG. 6 illustrates how a first lane 184 is dedicated to error correction code (ECC) operations, which may involve generation of correction codes and/or application of correction codes to rebuild data stored in the data storage device 182. The dedication of a single type of system operations, such as ECC, data encryption, NVMe namespace organization, or background data maintenance, allows the dedication module 162 to capitalize on the known, trusted capabilities/configurations of the identified hardware origin, such as operating tolerances, failure rates, default protocols, and power consumption, to conduct the selected system operation with greater efficiency, accuracy, and/or performance than if a lane of unknown origin was utilized. That is, use of a lane with unknown origin corresponds with reduced efficiency and/or performance due to at least a mismatch of system operation requirements and lane capabilities/configurations.

Although not required, the dedication module 162 can assign particular host-generated requests to a lane of known, or unknown, origin. For instance, a lane with unknown manufacturer origin 186 can be assigned to satisfy solely host-generated read requests while a lane 188 from a known manufacturing origin can be concurrently assigned to satisfy random write requests to memory of the data storage device 182. Some embodiments of the dedication module 162 customize lane execution by the type, size, and/or destination of host-generated requests, which can further optimize operation by utilizing a greater volume of the lane's maximum performance.

While not all hardware of a data storage device 182 is required to be identified by manufacturing origin, some lanes 190 of a communication bus of a data storage device may have a predicted origin from the dedication module 162 that corresponds with an expected range of operating parameters and/or configurations. Such predicted lane 190 aspects allows the dedication module 162 to assign a single system operation, such as parity data generation, data mirroring, and/or data striping for RAID purposes, that match the expected lane 190 configuration/capabilities to maintain, or improve, overall system 180 performance over time.

It is noted that the matching of system operations to the capabilities and/or configurations of available system 180 lanes can correspond with a theme selected by the dedication module 162. As a non-limiting example, the dedication module 162 can assign system operations to particular lanes to provide greater overall system 180 reliability at the expense of request satisfaction speed or request satisfaction consistency over available bandwidth. Various embodiments of the dedication module 162 can alter the assigned system operation/request in response to changing system 180 conditions, type of pending requests, and/or performance requirements, such as quality of service contracts or deterministic window thresholds.

The isolation of particular operations or requests for a selected lane is not limited to a particular mechanism, but some embodiments redirect operations/requests that do not match the assigned lane operation/request in accordance with a predetermined distribution plan. For instance, the dedication module 162 can generate a distribution plan that establishes a hierarchy of hardware for pending system operations and host-generated data access requests. An example hardware hierarchy can be arranged with known hardware selected first before hardware with predicted origin then unknown hardware followed by newly installed hardware. Such hardware hierarchy configuration allows a distribution plan to efficiently isolate a selected system operation and/or pending request to a particular system hardware by redistributing operations/requests to the first available hardware of the hierarchy.

A distribution plan can, in some embodiments, involve sending operations and/or requests to hardware labeled by the dedication module 162 as having certain characteristics, such as bandwidth, average latency, error rate, or average pending volume. The dedication module 162 may carry out a distribution plan to balance certain selected system characteristics, which can level-load operation and provide greater system consistency and/or availability for new activity. That is, the dedication module 162 can utilize the isolation of a selected operation/request to a particular lane to redistribute operations/requests to other lanes in a manner that provides greater overall system capabilities and/or performance than if operations/requests were randomly, or unintelligently, moved to different lanes or hardware of the system to accommodate the isolation of operations/requests to selected hardware lanes.

Figure 7:
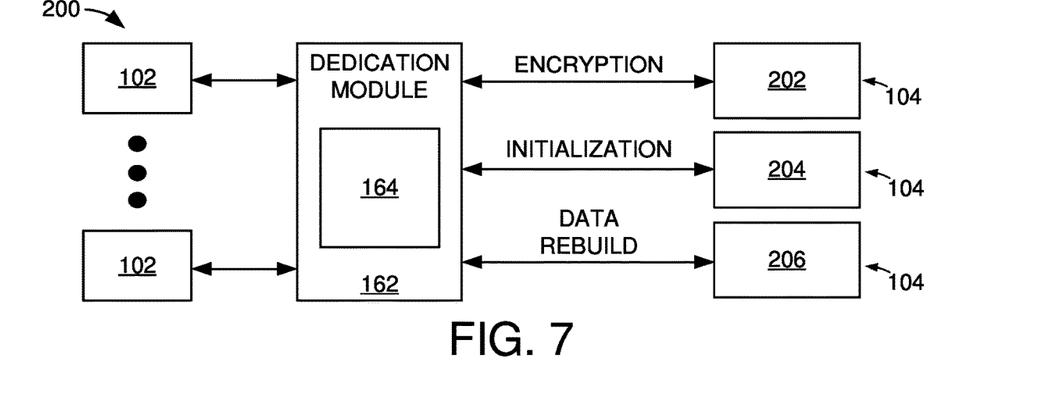
FIG. 7 depicts a block representation of portions of an example data storage system employed in accordance with assorted embodiments.

FIG. 7 depicts a block representation of portions of an example distributed data storage system 200 that intelligently assigns system operations to downstream data storage devices 104 in response to identified hardware manufacturing origin. The identification of hardware origin allows the dedication module 162 to generate one or more dedication strategies/plans that prescribe how and when known, trusted hardware can be utilized for various system operations. In the non-limiting example system 200, a first data storage device 202 has hardware with known origin while devices 204 have unknown hardware origin and device 206 has a hardware origin predicted by the dedication module 162 in response to system 200 activity.

Although some, or all, of the hardware of the first device 202 may have known origins, the dedication module 162 can divert one or more system operations to the device 202 for completion along with host-generated data access requests. An operation may be diverted from other data storage devices 104 or upstream network components. The type, complexity, and duration of a system operation diverted to the first device 202 is not limited and may involve generation of data, such as error correction code assignment, parity data creation, metadata assignment, or data mapping, or involve actions, such as data rebuilding, security verification, encryption of data, or background data operations.

With the knowledge of the manufacturing origin of hardware for the first device 202, an operation can be assigned without upstream processing or alteration. For instance, the dedication module 162 can assign data compression, encryption, or protection to the first device 202 without conducting any of the assigned activity with upstream components, such as a network controller or node. In other words, dedication module 162 can choose which system operations to involve upstream processing capabilities and which system operations to skip upstream capabilities in order for processing capabilities of downstream data storage devices 104 to exclusively handle the assigned operation.

By dedicating system operations to known hardware of downstream data storage devices 104 for completion, the dedication module 162 can free processing and interconnections of the system 200 for other activity or to be available for new operations and host-generated requests. The identification of the manufacturing origin of some, or all, of the hardware of a data storage device 104 further allows the dedication module 162 to intelligently select system operations for device processing and satisfaction that leverage the known capabilities and/or configurations of the hardware.

In the non-limiting embodiment shown in FIG. 7, the dedication module 162 responds to the identification of hardware in a downstream data storage device 104 by assigning previously processed data compression to the device 204 with unknown manufacturing origin and initialization of a newly installed system 200 component to the downstream device 206 with a predicted manufacturing origin. It is contemplated that the dedication module 162 assigns multiple different system operations, such as RAID, data rebuilding, or garbage collection, to a single downstream data storage device 104 to be completed sequentially, which further increases system performance and availability as the downstream device 104 satisfies system operations with minimal latency.

For the data storage devices 204 with unknown hardware origins, the dedication module 162 may divert system operations from other system components, but with additional handling operations that ensure the destination device 204 has sufficient data, formatting, and information to complete the assigned operation. In other words, the knowledge of the hardware manufacturing origin of a device allows system operations to be assigned by the dedication module 162 that utilize the known operating capabilities, performance, and protocol to reduce the volume of upstream processing necessary to complete the operation. It is contemplated that devices 204 with unknown hardware manufacturing origin are not assigned system operations and, instead, are assigned particular types of data access requests that can be conducted with minimal security and other processing intensive overhead operations. For instance, devices 204 with unknown hardware can be assigned sequential writes, sequential reads, random writes, random reads, writes above a selected size, or writes for data believed to be infrequently accessed.

The assignment of selected system operations and/or types of data access requests can follow a prescribed dedication strategy generated by the dedication module 162. The strategy may further prescribe how to manage connections with hardware with predicted origins to provide heightened data access performance, reliability, and/or security. Some embodiments of a dedication strategy utilize hardware with a predicted origin for maximum data access performance. For instance, the dedication module 162 may assign particular types of data accesses, data, and/or system tasks to the device 206 that provide the best possible speed, error rate, latency, or consistency. Such assignment can also be conducted for known hardware, but use of predicted hardware origin for maximum data access performance can mitigate the risk to data security by employing low security level data.

The parallel connections of the respective data storage devices 104 can, in some embodiments, allow for concurrent processing and satisfaction of data accesses and system operations. It is contemplated that system operations can be selected by the dedication module 162 to capitalize on known hardware capabilities, which can produce lower volumes of task/data processing for upstream system components while known/predicted hardware origins are utilized for known protocol, procedure, and limits to provide customized operation that optimizes system performance, reliability, and/or security.

The recognition of the origin of hardware for a system component can be particularly advantageous in large-scale distributed data storage systems where numerous devices are regularly changed so that new devices are initialized, verified for security purposes, and sources of system tasks. The deactivation of some hardware aspects of a system can provide dormant capabilities that can be selectively activated upon operational triggers, such as recognition of a hardware's origin, to fulfill the known, trusted capabilities of the connected hardware. The intelligent identification of hardware that can be dormant may be undertaken by the hardware module in response to various prompts, such as a consistent average system performance or reduction in system processing demand over time.

Figure 8:
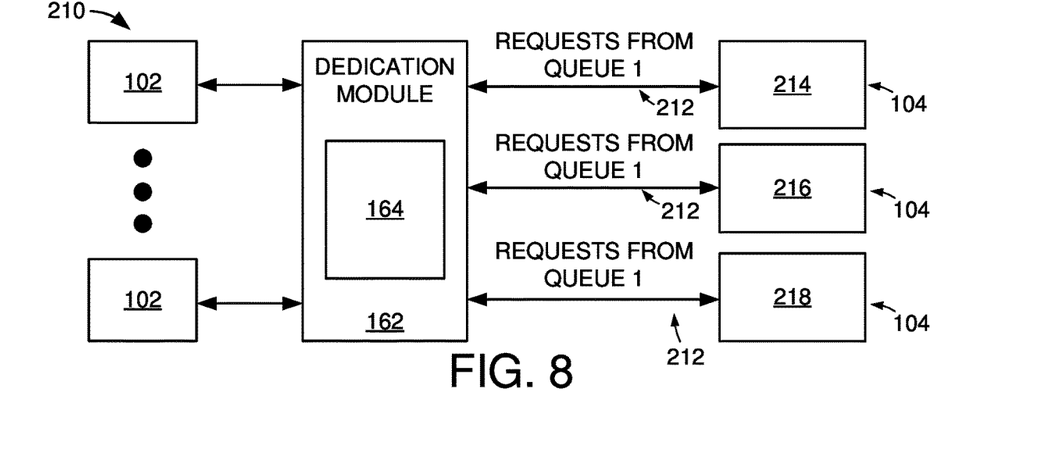
FIG. 8 depicts a block representation of portions of an example data storage system carrying out various embodiments.

FIG. 8 depicts a block representation of portions of an example distributed data storage system 210 that employs a dedication module 162 to execute a dedication strategy in response to identification of the manufacturing origin of connected hardware. The passive, or active, correlation of manufacturing origin for connected data storage devices 214/216/218 allows the dedication module 162 to transition at least one lane 212 for each device 214/216/218 to dedicated satisfaction of host-generated requests pending in a selected queue.

It is noted that the various data storage devices 214/216/218 may be separate components with matching or dissimilar computing characteristics, such as capacity, speed, physical size, and hardware configuration. Regardless of the matching or dissimilar computing characteristic of the respective devices 214/216/218, the devices may share a common manufacturing origin that is actually detected, or predicted, by the dedication module 162 after logging device activity and correlating such activity with known manufacturing origin characteristics, such as operating range, voltage, latency, signal strength, and generated metadata.

The identification of device manufacturing origin allows the dedication module 162 to dedicate selected interconnections, such as a lane, channel, bus, or port, to each device 214/216/218 for selected operations while moving one or more pending operations previously assigned to the selected interconnections to other interconnections or other devices of the system 210. That is, the dedication module 162 responds to detected, or predicted, device origin by reorganizing pending requests and/or system operations so that a selected type of request/operation is solely executed by the selected interconnection. In the non-limiting embodiment shown in FIG. 8, interconnections and the associated device hardware for the respective devices are concurrently dedicated to satisfying host-generated data access requests pending in a particular queue (queue 1), which provides a burst mode for the system 210 compared to concurrent satisfaction of different requests/operations from different queues/buffers.

The concurrent dedication of interconnections/hardware to the satisfaction of requests from a single queue is not required, but can provide maximum request satisfaction performance that can accomplish a variety of beneficial system 210 goals. For instance, the dedication module 162 can utilize the example burst mode of concurrent dedicated lanes for satisfaction of requests from a single queue/buffer to clear a backlog of pending requests, which can increase data security, availability for new host-generated requests, overall request satisfaction times. The clearing of a single queue of pending host-generated requests allows a relative blank slate for the dedication module 162 to make alterations to logical groupings of data and/or memory, such as namespaces, garbage collection units, and RAID stripes.

The utilization of concurrent interconnections for the satisfaction of a common system operation or type of request is particularly effective due to the matching of lane/hardware to pending/queued requests by the dedication module 162. In other words, the dedication module 162 can execute a dedication strategy that responds to detected, or predicted, hardware capabilities in downstream data storage devices 104 that correspond with manufacturing origin by selecting an operational theme that optimizes the known hardware capabilities. For instance, the dedication strategy can prescribe a theme, such as sequential writes, random writes, writes with a size within a selected range, reads with a size within a selected range, or particular system operations, like error correction code assignment, correction code usage to rebuild data, RAID construction, data encryption, or data compression, that are assigned to be solely carried out on one or more hardware with known, or predicted, manufacturing origin that is conducive to the hardware's capabilities.

By dedicating operation of system hardware to satisfy an intelligently selected type of request or system operation, maximum performance for at least some system hardware can be achieved. Execution of a preexisting dedication strategy can provide, for example, high bandwidth for relatively large requests/operations, low latency for relatively small requests/operations, or low error rate for high priority requests/operations that may involve security or guaranteed performance requirements. It is contemplated that different manufacturing origins, and/or different hardware from a single manufacturing origin, can be utilized for different dedicated operational themes, which can result in separate hardware concurrently operating to provide different system goals, such as request execution latency, operation bandwidth, or request error rate.

The dedication strategy, in some embodiments, utilizes known hardware manufacturing origin capabilities to balance usage across the system. As a non-limiting example, selected types of request or system operations can be dedicated to hardware with a known origin to mitigate the accumulation of activity for various known and unknown hardware of the system. That is, host-generated data access requests and system operations can be reorganized in accordance with the dedication strategy to known and/or unknown hardware to balance hardware usage for one or more hardware components relative to the hardware's maximum usage capability. The dedication strategy may set a particular threshold and/or range of hardware usage, such as 50%, 75%, or 90% of maximum processing or bandwidth capability, for a single hardware component or for the system as a whole.

The balancing of hardware usage can maintain a capability for the system to handle new requests and/or system operations without jeopardizing performance of existing requests and/or system operations. In other words, the dedication strategy can prescribe adaptations of an initial hardware assignment scheme in response to changes in system operation, such as hardware failure or influx of large processing requests/operations, to maintain a threshold operational performance to one or more system hosts.

The logging of system activity over time allows the dedication module to accurately predict the occurrence of future events, which provides an opportunity to populate the dedication strategy with request/operation dedications for hardware with known/predicted origin and capabilities to mitigate the degradation of system performance and/or capabilities as a result of the occurrence of the predicted event. For instance, the dedication module can forecast power loss, influx of pending requests, execution of system operations, or servicing of high priority data, and prescribe dedicated hardware utilization that proactively reorganizes pending host-generated data access requests and/or system operations among system hardware to reduce the impact of the forecasted event on future performance, security, and/or reliability parameters for a single hardware component, or the system as a whole.

In the event a predicted event involves a high priority condition, such as writing high security data, upgrading firmware, rebuilding priority data, conducting data encryption, or executing data compression, the dedication strategy can reorganize current and future pending requests and system operations to ensure a requisite volume of processing is available to service the predicted event without degrading system performance, such as overall time to completion, latency, and processing overhead, below an established threshold. That is, the dedication module, and strategy, can create different utilizations of hardware with known manufacturing origin to reduce the impact of predicted future events from altering operational metrics for a single hardware component, such as a data storage device, or the data storage system altogether.

The assorted capabilities of the dedication module and dedication strategy can, in other embodiments, be utilized during slow system times to mitigate the degradation of performance during peak processing demand. In other words, dedication of requests/operations to known hardware can allow processing to initialize new components, upgrade firmware, and reset namespace configurations, which are relatively processing intensive, during slow system processing conditions to reduce the imbalance of processing usage among different hardware of the system. Detected, or predicted, low system processing conditions to service pending host-generated requests and/or system operations can be utilized by a dedication strategy to reduce pending background operations and increase hardware reliability, data reliability, garbage collection efficiency, data mapping, metadata management, RAID creation, and data rebuilding.

Figure 9:
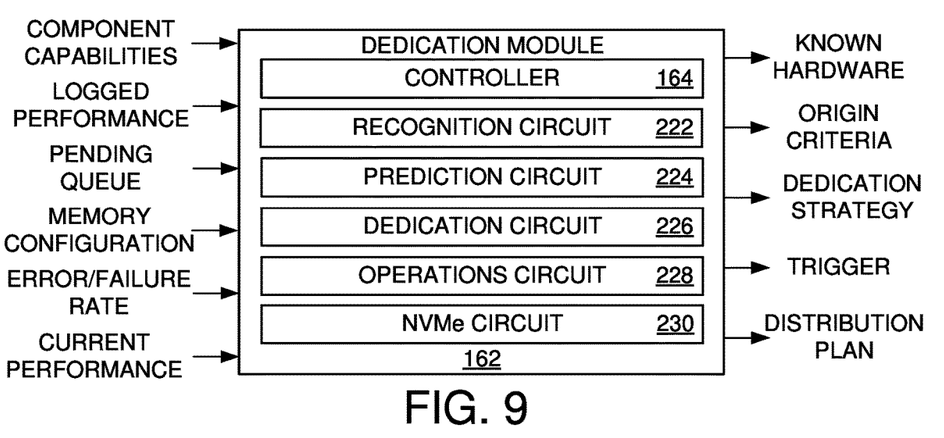
FIG. 9 depicts a block representation of an example dedication module capable of being utilized in a distributed data storage system in some embodiments.

FIG. 9 depicts a block representation of an example dedication module 162 that can be employed in a distributed data storage system in accordance with various embodiments. The module 162 can be configured as hardware resident in any aspect of a data storage system. As an example, the module 162 can be circuitry of a printed circuit board located alone and connected to assorted components of a system or positioned within a component of the system, such as a host 102, network component 106, or data storage device 104.

A dedication module 162, in some embodiments, has a local controller 164 that processes input information, such as logged system activity, pending requests, system configurations, and component capabilities, to generate an optimization strategy that utilizes strategically selected aspects of the system to take advantage of known, trusted components to provide consistent and reliable data access performance over time. The module controller 164 can operate alone, or in conjunction with a recognition circuit 222 to passively, or actively, evaluate the operating parameters of a system component to determine an origin of the component.

Various embodiments of the recognition circuit 222 translate various input information about system data, hardware, configuration, operation, and performance to select between active and passive identification of the origin of system components. That is, the recognition circuit 222 can proactively generate tests and/or procedures to either passively identify a component's origin by evaluating selected operating characteristics, such as latency, input/output per second, average completion time, assigned error correction, and security protocol, or conduct at least one pattern of test signals/data generated by the recognition circuit 222 to actively determine the manufacturer and/or original firmware of the component. The ability to intelligently select between active identification and passive identification allows the dedication module 162 to balance time for identification of origin with amount of system processing resources utilized during identification.

It is noted that passive identification of a component's origin can involve the correlation of predetermined criteria generated by the dedication module 162 with operational characteristics and/or performance passively attained while the component is carrying out data access requests and system tasks. The predetermined criteria, in some embodiments, consists of operational characteristics that correspond with a component's origin, such as assigned metadata, mapping, error correction code, or encryption. As such, the dedication module 162, and recognition circuit 222, can maintain the criteria over time to ensure the accurate and efficient identification of a component's origin, which enables the dedication module 162 to optimize the utilization of dormant and/or throttled aspects of the system to take advantage of the known, trusted operating characteristics of the component.

While assorted embodiments select to actively, or passively, identify a component's origin, the dedication module 162 may, alternatively, translate system information into a forecasted component origin. For instance, the dedication module 162 may utilize a prediction circuit 224 to translate collected operational information into a predicted component origin, which provides a less accurate origin determination than active or passive origin identification, but with less processing requirements. The prediction circuit 224 can employ logged system data, model data from other data storage systems, and theoretical operational data to predict what operational activity of a system component indicates the component's origin, such as NVMe namespace assignment, caching scheme, security protocol, metadata assignment, or data encryption.

The use of the prediction circuit 224, in various embodiments, forecasts test patterns of data and/or system signals to increase the efficiency and/or accuracy of active component origin identification. It is contemplated that the prediction circuit 224 forecasts which hardware to throttle or deactivate into a dormant state without degrading average system performance over time, such as time to complete a data access request, error rate, or access latency. The ability of the dedication module 162 to adapt which hardware aspects of a system are dormant or throttled, from collected or predicted system activity, allows for efficient system dynamics that provide optimized utilization of connections with known, trusted components.

Although not required or limiting, known component manufacturing origins can be utilized by the dedication module 162 to assign system operations and/or host-generated data access requests with a dedication circuit 226. By knowing, or intelligently predicting, the manufacturing origin of a component, the hardware module 162 can divert requests and/or operations, set by the dedication circuit 226, among system hardware so that select hardware is dedicated to a particular type of request or system operation without jeopardizing the average performance of a device, namespace, or system as a whole. In other words, the manufacturing origin of a component indicates the operational capabilities and deficiencies of the component, which allows the hardware module 162 to dedicate intelligently selected requests or system operations to select hardware without degrading the average performance, reliability, or security of a system device, logical namespace, or the complete system.

In operation, the dedication circuit 226 can populate the dedication strategy with possible manners of optimizing known hardware manufacturing origin by solely servicing selected types of requests or system operations. The capabilities of known hardware from the dedication circuit 226 can complement the operational triggers generated by the operations circuit 228 that indicate when the dedications of the dedication strategy are to be implemented. As a result, the operations circuit 228 identifies operational triggers, such as low system processing volume, high error rate, large pending data volume, or complex system operation execution, that prompt a reorganization of pending requests and/or system operations so that a single type of host-generated request or system operation is conducted for a selected amount of time.

While the operations circuit 228 can identify operational opportunities that trigger optimal execution of dedicated requests/operations for selected hardware prescribed by a dedication strategy, the dedication controller 164 can additionally generate a distribution plan that prescribes where pending system operations and host-generated requests are to be diverted to dedicate hardware to execution of a selected type of request/operation. The proactive generation of a distribution plan by the dedication module 162 allows for efficient response to a detected, or predicated, operational trigger compared to responding to a trigger by determining where assorted pending requests and/or system operations are to be diverted to provide a single selected type of request/operation.

The ability to manipulate hardware operation in response to identified hardware manufacturing origin allows for peak hardware performance when known, trusted hardware is present. Identified hardware manufacturing origin may further allow for optimization of logical memory groupings and data handling protocol associated with NVMe. An NVMe circuit 230 of the hardware module 162 can provide the optimization strategy with dynamic configurations that take advantage of the known aspects of the hardware. For instance, an NVMe switch can be activated in response to an identified hardware manufacturing origin, in accordance with the dedication strategy, to convert portions of a distributed data storage system to NVMe operation with logical namespaces and parallel command/request/data pathways.

The activation of logical and/or structural aspects of a system to provide NVMe operation that utilizes known operating capabilities of the identified hardware to provide optimized completion of data access requests and/or system tasks. Some embodiments of a dedication strategy have dynamic configurations prescribed by the NVMe circuit 230. A non-limiting example consists of changing namespace size, location, or execution order while some embodiments execute a dedication strategy to alter data queue organization and/or destination to move data towards hardware with known origins. Hence, the identification of hardware origin can correspond with manipulation of NVMe configuration and/or operation to take advantage of known operating parameters of hardware to provide increased performance, efficiency, reliability, security, and/or consistency.

Through the assorted circuitry of the hardware module 162 a dedication strategy can be generated, updated, and executed to increase performance, reliability, and/or consistency of a distributed data storage system. The identification of the manufacturing origin of hardware can inform the dedication strategy of what requests, or system operations, to dedicate to particular hardware to optimize system performance, security, and reliability while operational triggers identify when hardware dedications are to be conducted. As a result, passively or actively identifying hardware manufacturing origin can be utilized to leverage the capabilities of the known hardware to optimize the completion of system operations, NVMe operation, and satisfaction of host-generated data access requests.

Figure 10:
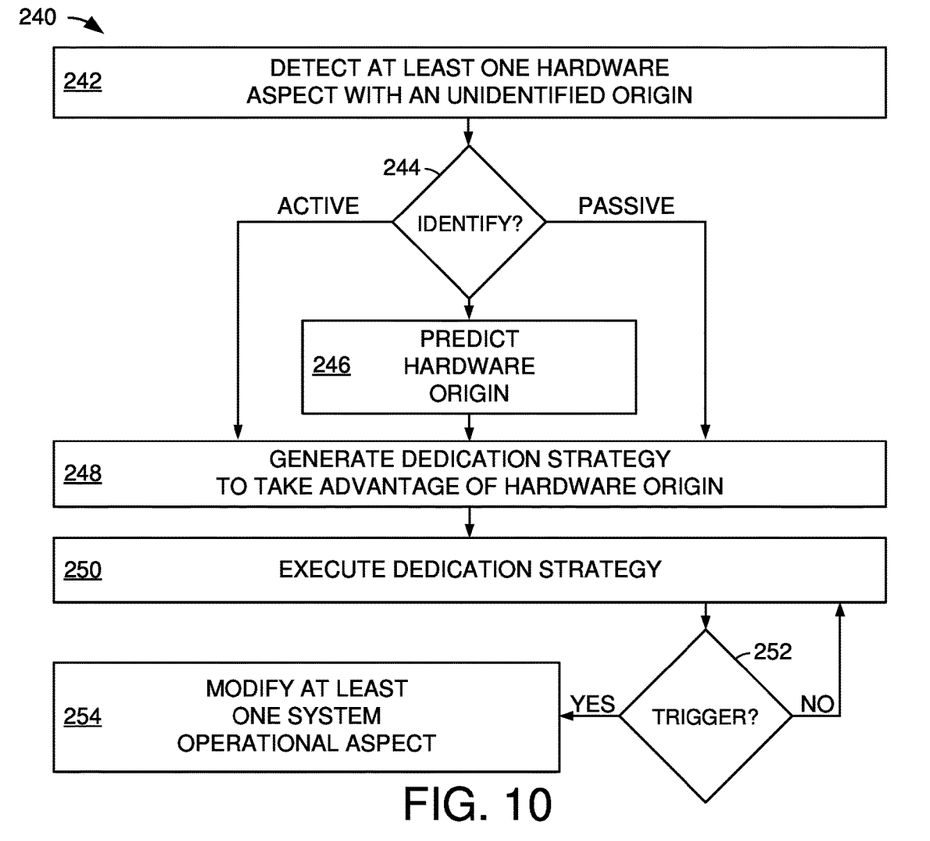
FIG. 10 is a flowchart of an example dedication routine the can be executed with the respective aspects of FIGS. 1-9 in accordance with assorted embodiments.

FIG. 10 flowchart of an example dedication routine 240 that can be carried out with assorted embodiments of the distributed data storage systems in FIGS. 1-9. Upon connection of various hosts to data storage devices via a hardware module, step 242 detects at least one hardware aspect that has an unidentified origin. The hardware module proceeds, in decision 244, to determine if, how, and when, hardware is to be identified. For instance, decision 244 can evaluate if active testing of hardware or if passive activity monitoring for hardware identification provides desired system performance, reliability, and security. That is, decision 244 can compare the real-time capabilities of the system with the requirements of active and passive hardware origin identification to determine when and how hardware origin can be determined without degrading system averages.

Alternatively, decision 244 can determine that system resources cannot maintain desired levels over time by conducting either passive or active hardware origin evaluation. As such, decision 244 prompts step 246 to predict the origin of hardware with the hardware module based on logged and/or model system information. The detection, or prediction, of the origin of hardware allows the hardware module to generate a dedication strategy in step 248 that seeks to utilize the known aspects of hardware to provide increased consistency, reliability, security, and/or performance.

At any time, the hardware module can begin executing the dedication strategy in step 250 to dedicate at least one hardware component of the system to a selected type of request or system operation. Carrying out step 250 may coincide with a predetermined operational trigger that is detected, or predicted, by the dedication module. The execution of the dedication strategy in step 250 can perform one or more proactive actions prior to the detection, or prediction, of an operational trigger that prompts dedication of hardware to a selected type of request/operation. For instance, step 250 can logically transition one or more pending requests or system operations between queues, buffers, namespaces, or devices in anticipation of dedicating requests/operations to hardware of known manufacturing origin.

It is noted that step 250 can be performed with, or without, prompting by an operational trigger. For example, the dedication module may have a timer that prompts execution of the dedication strategy or the dedication strategy may be continually executed after step 248. Conducting the dedication strategy may involve logically and/or physically moving data and/or data requests to different hardware of the system in accordance with a preexisting distribution plan. Step 250 can create data, in some embodiments, to satisfy some system operations, such as data mapping, striping, and mirroring as well as metadata creation or error correction code assignment. It is contemplated that step 250 involves manipulating data, such as compressing or encrypting data.

The execution of the dedication strategy in step 250 can alter and/or create functional aspects of the distributed data storage system to take advantage of the identified manufacturing origin of hardware. For instance, step 280 can deactivate some hardware, throttle hardware to an artificially reduced operational capacity, assign multiple different system operations, establish an NVMe condition, or reconfigure an NVMe condition. It is contemplated that step 250 can be conducted any number of times to carry out portions of an optimization strategy with any number, and type, of different operational alterations.

After the strategy actions are conducted in step 250, decision 252 can evaluate if a predetermined operational trigger is present, imminent, or predicted. That is, the dedication strategy can be associated with one or more operational triggers, such as number of connected devices, data access latency, error rate, volume of pending commands/tasks/requests, or available processing capability, that corresponds with alteration of at least one operational aspect of the distributed data storage system in step 254. Although not required or limiting, step 254 may respond to an operational trigger by activing previously dormant hardware, pausing execution of a system operation, or changing an NVMe configuration.

It is noted that step 254 may operate in conjunction with, or in replacement of, the execution of the dedication strategy in step 250. That is, multiple different dedication strategies, or different actions of a single dedication strategy, may operate sequentially or concurrently with steps 250 and 254. As such, dedication strategy actions can be made with, or without, operational triggers being present, imminent, or predicted.

Through the execution of routine 240, the intelligent identification of hardware origin can be leveraged into optimized system functionality by taking advantage of the capabilities of hardware originating from known, trusted manufacturers. The knowledge of the origin of hardware corresponds with an understanding of the default protocol, settings, and restrictions along with the processing, data storage, power, and security capabilities, which allows a hardware module to intelligently dedicate the satisfaction of host-generated requests and/or system operations to maintain, or increase, average system performance, data reliability, and security.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
connecting a host to a device and a dedication module using a plurality of parallel interconnections;
identifying a manufacturing origin of the device with the dedication module;
dedicating a selected interconnection from the plurality of parallel interconnections for transfers associated with a first type of host-generated data access requests with the device, the first type of host-generated data access requests chosen by the dedication module in response to an operating capability correlated to the device by the dedication module based on the identified manufacturing origin;
using the selected interconnection to sequentially process a plurality of the first type of host-generated data access requests by the device; and
concurrently using at least one other interconnection from the plurality of parallel interconnections to sequentially process a plurality of a different, second type of host-generated data access requests with the device.

2. The method of claim 1, wherein the manufacturing origin is identified passively while the device completes a selected host-generated data access request prior to the dedication of the selected interconnection to the first type of host-generated data access requests.

3. The method of claim 1, wherein the manufacturing origin is identified by monitoring satisfaction of at least one selected host-generated data access request prior to the dedication of the selected interconnection to the first type of host-generated data access requests.

4. The method of claim 1, wherein the selected interconnection comprises at least a selected one of a bus, channel, lane or port configured to transfer data and commands between the device and the host.

5. The method of claim 1, wherein the selected interconnection is a first selected interconnection, and wherein the method further comprises using a different, second selected interconnection to concurrently direct the device to perform a selected system operation associated with data stored by the device.

6. The method of claim 1, wherein the first type of host-generated data access requests and the second type of host-generated data access requests are different types of read or write requests to transfer user data between the device and the host.

7. The method of claim 1, wherein the first type of host-generated data access requests are data writes with a size within a selected range as designated by the dedication module.

8. The method of claim 1, wherein the first type of host-generated data access requests are data reads with a size within a selected range as designated by the dedication module.

9. A method comprising:
connecting a host to a device and a dedication module using a plurality of parallel interconnections;
identifying a manufacturing origin of the device with the dedication module;

dedicating a selected interconnection from the plurality of parallel interconnections for transfers associated with a selected system operation to the device, the selected system operation chosen by the dedication module in response to an operating capability correlated to the device by the dedication module based on the identified manufacturing origin;

using the selected interconnection to direct the device to perform the selected system operation; and concurrently using at least one other interconnection from the plurality of parallel interconnections to sequentially process at least one data access request to transfer data between the host and the device.

10. The method of claim 9, wherein the selected system operation is at least one of a cryptographic operation, an error correction code assignment, an error correction code utilization for data rebuilding, a RAID operation, a firmware upgrade, a security operation, or a device initialization.

11. The method of claim 9, wherein the selected system operation involves executing a cryptographic function on data stored in the device.

12. The method of claim 9, wherein the selected system operation involves assigning an error correction code to data stored in the device.

13. The method of claim 9, wherein the selected system operation is a first type of selected system operation and the selected interconnection is a first selected interconnection, and wherein the method further comprises performing a different, second type of selected system operation by the device as directed by the host using a second selected interconnection from the plurality of parallel interconnections.

14. An apparatus comprising a dedication module comprising a controller and associated memory configured to interconnect a host to a device using a plurality of parallel interconnections, the controller of the dedication module configured to identify a manufacturing origin of the device and, in response thereto, dedicate a first interconnection from the plurality of parallel interconnections for a first type of system activity associated with a transfer of data between the host and the device, and to dedicate a different, second interconnection from the plurality of parallel interconnections for a different, second type of system activity associated with a transfer of data between the host and the device, the dedication of the first interconnection based on a unique operating capability of the device as determined by the identified manufacturing origin of the device.

15. The apparatus of claim 14, wherein the first type of system activity comprises a first type of host-generated data access requests to transfer first data between the host and a non-volatile memory of the device.

16. The apparatus of claim 15, wherein the second type of system activity comprises a different, second type of host-generated data access requests to transfer second data between the host and the non-volatile memory of the device.

17. The apparatus of claim 15, wherein the second type of system activity comprises a system operation carried out by the device as a background operation to facilitate further transfers of data between the host and the device.

18. The apparatus of claim 17, wherein the system operation is at least one of a cryptographic operation, an error correction code assignment, an error correction code utilization for data rebuilding, a RAID operation, a firmware upgrade, a security operation, or a device initialization.

19. The apparatus of claim 14, wherein the first selected interconnection comprises at least a selected one of a bus, channel, lane or port configured to transfer data and commands between the device and the host.

20. The apparatus of claim 14, wherein the dedication module is incorporated into a network controller, and the device is a solid-state drive (SSD).

* * * * *